(12) United States Patent  (10) Patent No.: US 12,504,041 B2
Zhao et al.  (45) Date of Patent: Dec. 23, 2025

(54) LINEAR MOTION GUIDE APPARATUS (71) Applicant: THK CO., LTD., Tokyo (JP)

(72) Inventors: Bin Zhao, Tokyo (JP); Hiroyuki Kishi, Tokyo (JP)

(73) Assignee: THK CO., LTD., Tokyo (JP)

( * ) Notice: Subject to any disclaimer, the term of this patent is extended or adjusted under 35 U.S.C. 154(b) by 118 days.

(21) Appl. No.: 18/263,304

(22) PCT Filed: Nov. 5, 2021

(86) PCT No.: PCT/JP2021/040691
§ 371 (c)(1),
(2) Date: Jul. 27, 2023

(87) PCT Pub. No.: WO2022/163050
PCT Pub. Date: Aug. 4, 2022

(65) Prior Publication Data
US 2024/0093727 A1  Mar. 21, 2024

(30) Foreign Application Priority Data
Jan. 29, 2021  (JP) .................. 2021-012648

(51) Int. Cl.
F16C 29/04  (2006.01)
(52) U.S. Cl.
CPC .......... F16C 29/041 (2013.01); F16C 29/043 (2013.01)
(58) Field of Classification Search
CPC .................. F16C 29/041; F16C 29/043
See application file for complete search history.

(56) References Cited

U.S. PATENT DOCUMENTS 3,944,307 A  3/1976 Bingle
8,573,847 B2 * 11/2013 Lee ................. F16C 29/043
384/47

(Continued)

FOREIGN PATENT DOCUMENTS

EP  1840395 A1  10/2007
JP  2004197850 A  7/2004

(Continued)

OTHER PUBLICATIONS

Translation of KR202110101906 obtained Apr. 29, 2025.*

(Continued)

Primary Examiner — James Pilkington
(74) Attorney, Agent, or Firm — NIXON & VANDERHYE (57) ABSTRACT A linear motion guide apparatus that is easily assembled is provided. The linear motion guide apparatus includes: two guide rails that are movable relative to each other in a longitudinal direction thereof via at least one rolling element; and a cage configured to hold the rolling element and hold a gear engaging with a meshing portion provided to at least one of the two guide rails. The cage includes: a first split body in which a rolling element holding portion that holds the rolling element and a gear holding portion that holds the gear are integrally formed; and a second split body in which a rolling element holding portion that holds the rolling element and a gear holding portion that holds the gear are integrally formed. The first split body and the second split body are joined to each other.

4 Claims, 12 Drawing Sheets (56) References Cited

U.S. PATENT DOCUMENTS

| | | |
|---|---|---|
| 9,784,311 B2 * | 10/2017 | Nara .................... F16C 33/585 |
| 2004/0156565 A1 | 8/2004 | Obara et al. |
| 2008/0107369 A1 | 5/2008 | Fujita |
| 2012/0163741 A1 | 6/2012 | Lee |

FOREIGN PATENT DOCUMENTS

| | | | |
|---|---|---|---|
| KR | 20120115625 A | | 10/2012 |
| KR | 20210101906 A | * | 8/2021 |
| TW | M548749 U | | 9/2017 |

OTHER PUBLICATIONS

International Search Report w/English translation for PCT/JP2021/040691 mailed Jan. 18, 2022, 5 pages.
Written Opinion of the ISA for PCT/JP2021/040691 mailed Jan. 18, 2022, 3 pages.
Extended European Search Report, issued in European Patent Application No. 21923055.4 dated Nov. 18, 2024.
Office Action, issued in Taiwanese Patent Application No. 110143881 dated Oct. 23, 2024.

* cited by examiner

LINEAR MOTION GUIDE APPARATUS

CROSS-REFERENCE TO RELATED APPLICATIONS

This application is the U.S. national phase of International Application No. PCT/JP2021/040691 filed Nov. 5, 2021, which designated the U.S. and claims priority to JP 2021-012648 filed Jan. 29, 2021, the entire contents of each of which are hereby incorporated by reference.

TECHNICAL FIELD

The present invention relates to a linear motion guide apparatus including a mechanism that controls positional displacement of a cage.

BACKGROUND ART

A linear motion guide apparatus including a positional displacement control mechanism that controls positional displacement of a cage is known (refer to Patent Literature 1). The linear motion guide apparatus includes two guide rails that can move relative to each other in a longitudinal direction thereof via at least one rolling element. The rolling element is held by a cage. When the two guide rails are repeatedly moved relative to each other, the cage may be displaced from the normal position. The positional displacement control mechanism is provided to control positional displacement of the cage.

The positional displacement control mechanism includes racks provided to the guide rails, and a pinion provided to the cage. When the two guide rails move relative to each other, the pinion moves in the normal position while meshing with the racks. Hence, it is possible to control positional displacement of the cage.

CITATION LIST

Patent Literature

Patent Literature 1: JP 2004-197850 A

SUMMARY OF INVENTION

Technical Problem

In the linear motion guide apparatus described in Patent Literature 1, the cage that holds the rolling element and a holder that holds the pinion are manufactured separately. The holder that holds the pinion is fitted into a fitting hole of the cage, and then joined to the cage by snap-fit.

However, the linear motion guide apparatus described in Patent Literature 1 requires three steps of (1) assembly of the cage and the rolling element, (2) assembly of the pinion and the holder, and (3) assembly of the holder and the cage, and has a problem that it takes time and effort for assembly.

The present invention has been made in view of the above problem, and an object thereof is to provide a linear motion guide apparatus that is easily assembled.

Solution to Problem

In order to solve the above problem, one aspect of the present invention is a linear motion guide apparatus including: two guide rails that are movable relative to each other in a longitudinal direction thereof via at least one rolling element; and a cage configured to hold the rolling element and hold a gear engaging with a meshing portion provided to at least one of the two guide rails, in which the cage has: a first split body in which a rolling element holding portion that holds the rolling element and a gear holding portion that holds the gear are integrally formed; and a second split body in which a rolling element holding portion that holds the rolling element and a gear holding portion that holds the gear are integrally formed, and the first split body and the second split body are joined to each other.

Advantageous Effects of Invention

According to the present invention, when the first split body and the second split body are joined together, then it becomes possible to hold the rolling element and the gear simultaneously. Hence, it is easy to assemble the linear motion guide apparatus. Moreover, the first split body and the second split body are joined together to hold the roller and the gear. Therefore, the roller and the gear can be reliably held.

DESCRIPTION OF EMBODIMENTS

Embodiments of a linear motion guide apparatus of the present invention are described hereinafter with reference to the accompanying drawings. However, the linear motion guide apparatus of the present invention can be embodied in various forms and is not limited to the embodiments described in the description. The embodiments are provided with the intention of enabling those skilled in the art to fully understand the invention by fully disclosing the description.

First Embodiment

Figure 1:
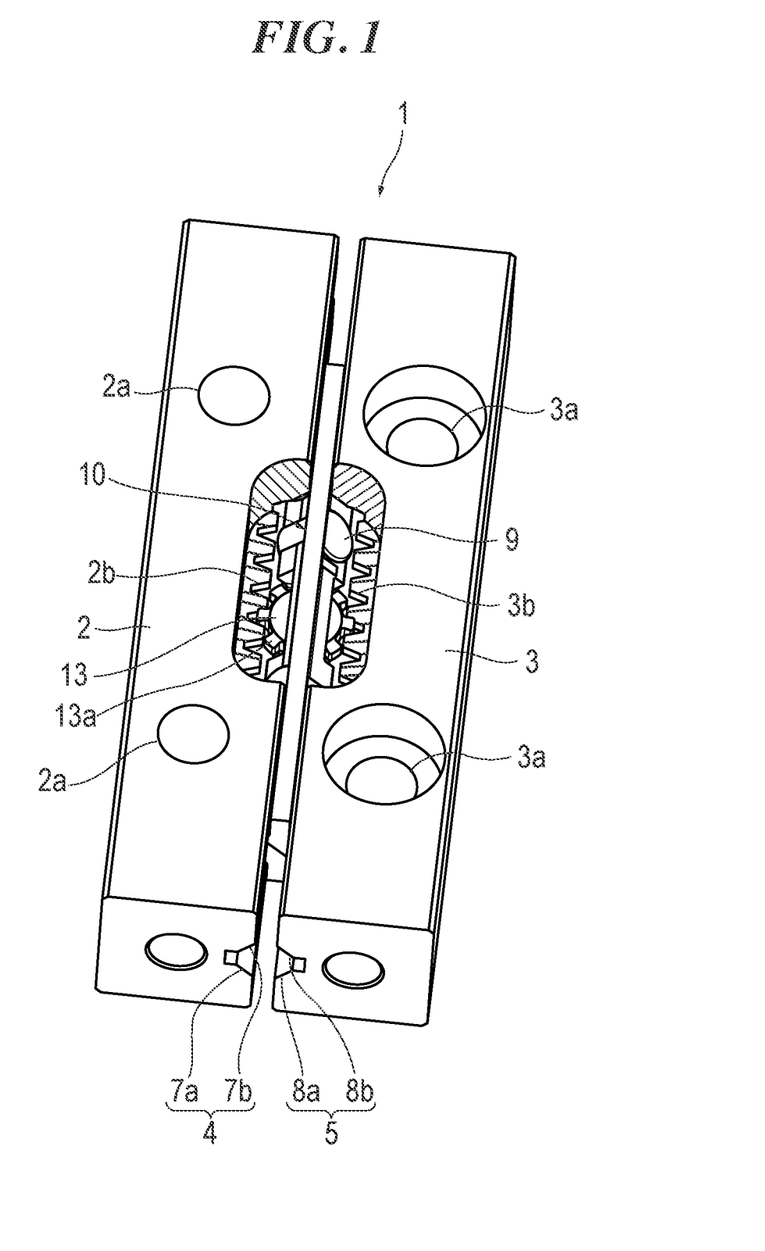
FIG. 1 is a perspective view (including a partial cross-sectional view) of a linear motion guide apparatus of a first embodiment of the present invention.

FIG. 1 is a perspective view of a linear motion guide apparatus 1 of a first embodiment of the present invention. Reference signs 2 and 3 denote guide rails. Grooves 4 and 5 having a V shape in cross section are formed in the guide rails 2 and 3, respectively. The grooves 4 and 5 include raceway surfaces 7a and 7b perpendicular to each other, and raceway surfaces 8a and 8b perpendicular to each other. Rollers 9 as rolling elements are placed between the opposing grooves 4 and 5 of the guide rails 2 and 3. The guide rails 2 and 3 can move relative to each other in a longitudinal direction thereof via the rollers 9.

Figure 2:
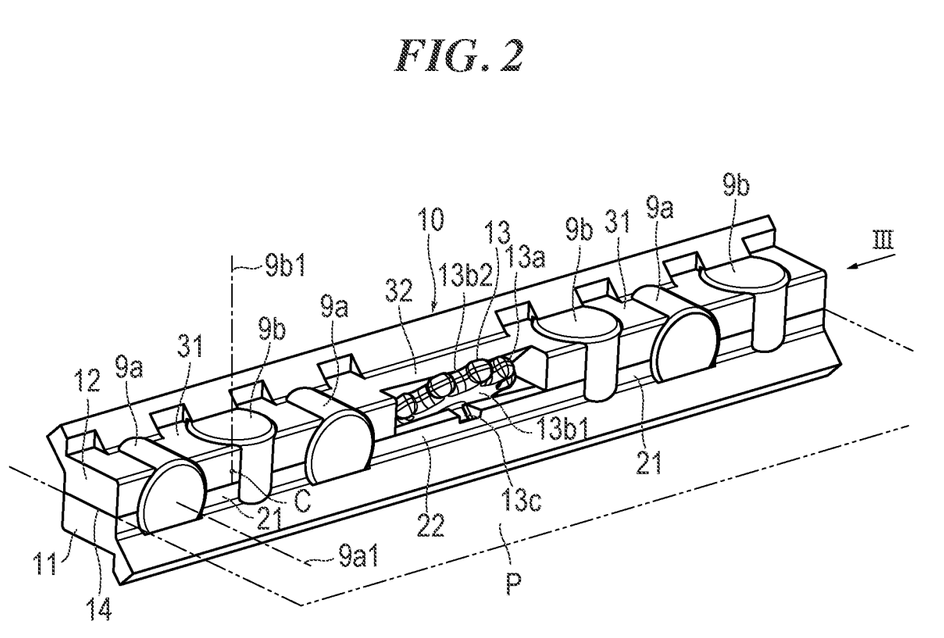
FIG. 2 is a perspective view of a cage incorporated in the linear motion guide apparatus of the embodiment.
Figure 3:
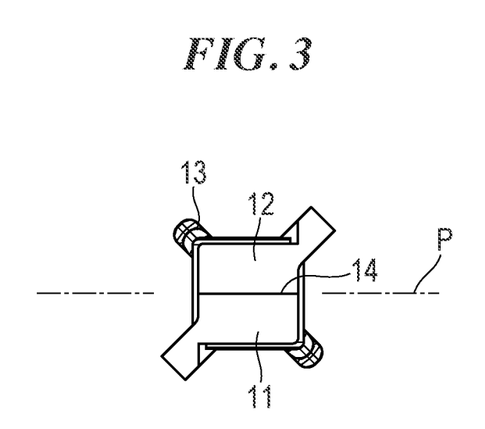
FIG. 3 is a view on arrow III of FIG. 2.

The rollers 9 include crossed rollers 9a and 9b being the adjacent rollers 9 whose axes are perpendicular to each other (refer to FIG. 2). The rollers 9 have an approximately square shape in which the diameter of the rollers 9 is slightly greater than the length of the rollers 9 in the axial direction in side view. The side surface of the roller 9a is in contact with the raceway surface 7a of the guide rail 2 and the raceway surface 8b of the guide rail 3. The side surface of the roller 9b is in contact with the raceway surface 7b of the guide rail 2 and the raceway surface 8a of the guide rail 3. A force acting on the guide rail 2 is transmitted to the guide rail 3 via the rollers 9a and 9b.

A mounting hole 2a for mounting on, for example, a table is formed in the guide rail 2. A mounting hole 3a for mounting on, for example, a base is formed in the guide rail 3. The shape of the guide rail 3 is substantially the same as a shape of the guide rail 2 flipped 180°.

As illustrated in FIG. 2, the rollers 9a and 9b are held by a cage 10 extending in the longitudinal direction along the guide rails 2 and 3. A pinion-like gear 13 is also rotatably held by the cage 10.

As illustrated in FIG. 1, rack-like meshing portions 2b and 3b are formed on the bottom portions of the grooves 4 and 5 of the guide rails 2 and 3. Teeth 13a of the gear 13 engage with the meshing portions 2b and 3b. The position of the cage 10 relative to the guide rails 2 and 3 is determined by the relative positions of the guide rails 2 and 3. Hence, it is possible to control positional displacement of the cage 10. In FIG. 1, the guide rails 2 and 3 are partially cut away in order to illustrate the gear 13 and the meshing portions 2b and 3b.

Note that the rack-like meshing portions 2b and 3b of the guide rails 2 and 3 are simply required to be capable of engaging with the gear 13, and may be formed with involute tooth profiles or may include a plurality of recessed places spaced equally apart in the longitudinal direction in the guide rails 2 and 3. Moreover, the teeth 13a of the pinion-like gear 13 are simply required to be capable of engaging with the meshing portions 2b and 3b, and may be formed with involute tooth profiles or may include a plurality of projections that fit into a plurality of recessed places.

As illustrated in FIG. 2, the rollers 9a and 9b and the gear 13 are held by the cage 10. The gear 13 is placed substantially in the middle of the cage 10 in a length direction thereof. The cage 10 includes a first split body 11 and a second split body 12 that are obtained by division along a mating surface 14 extending in a length direction of the guide rails 2 and 3. An axis 9a1 of the roller 9a and a center C of the roller 9b (the axial center of the roller 9b on an axis 9b1) are placed on substantially the same plane as a plane P including the mating surface 14. The axis 9b1 of the roller 9b is substantially orthogonal to the plane P.

Figure 4:
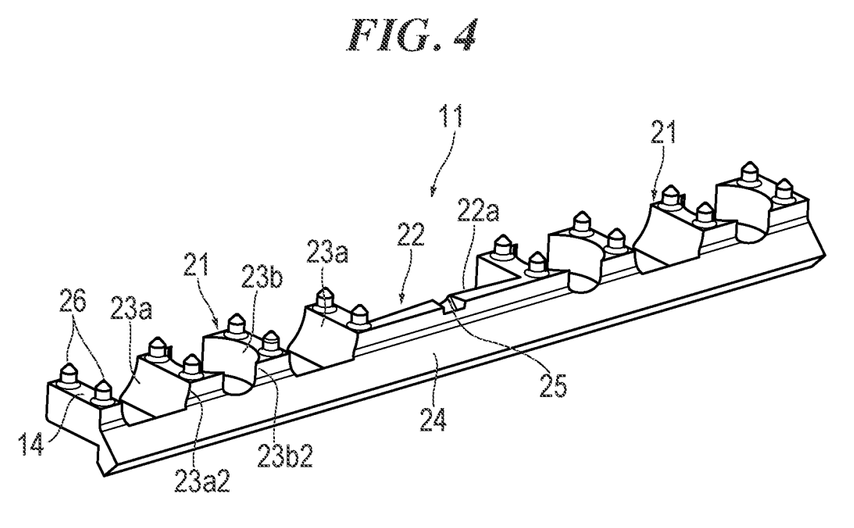
FIG. 4 is a perspective view of a first split body of the cage of the linear motion guide apparatus of the embodiment.

As illustrated in FIG. 4, a rolling element holding portion 21 that holds the rollers 9a and 9b and a gear holding portion 22 that holds the gear 13 are integrally formed in the first split body 11. The rolling element holding portion 21 and the gear holding portion 22 are integrally formed by, for example, resin molding, metal molding, laminate molding, or cutting.

Figure 5:
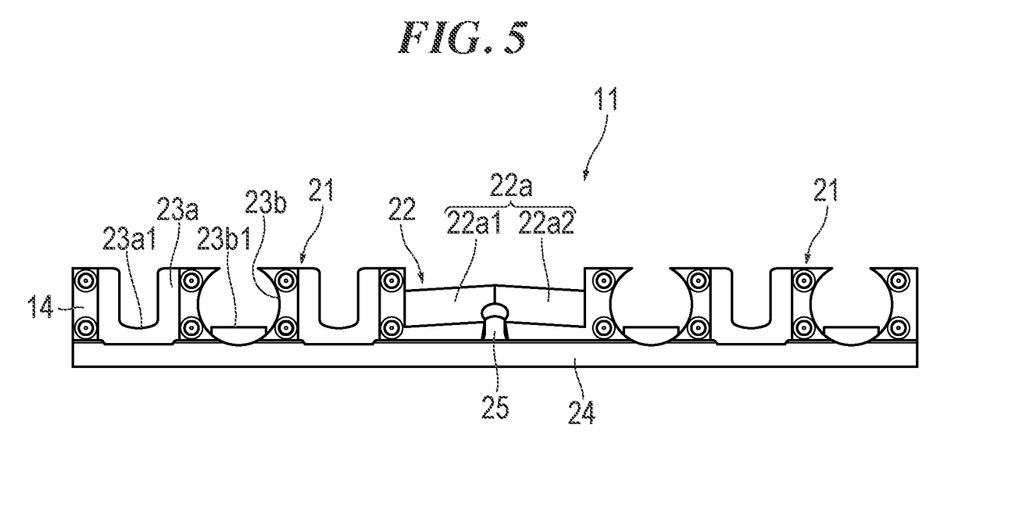
FIG. 5 is a plan view of the first split body.

Recesses 23a and 23b in which the rollers 9a and 9b are partially housed are formed in the rolling element holding portion 21 of the first split body 11. For example, a half (lower half) of the roller 9a whose axis 9a1 points horizontally is housed in the recess 23a. The recess 23a is formed in a semi-cylindrical shape fitting the shape of the half of the roller 9a. The roller 9a is inserted into the recess 23a in a direction orthogonal to the axis 9a1. As illustrated in a plan view of FIG. 5, an opening 23a1 is formed in the bottom of the recess 23a in such a manner as to expose the side surface of the roller 9a. An opening 23a2 (refer to FIG. 4) is formed in the wall of the recess 23a in such a manner as to expose the bottom surface of the roller 9a.

As illustrated in FIG. 4, a half (lower half) of the roller 9b whose axis 9b1 points vertically is housed in the recess 23b. The recess 23b is formed in, for example, a short cylindrical shape fitting the shape of the half of the roller 9b. The roller 9b is inserted into the recess 23b in the axial direction. An opening 23b1 (refer to FIG. 5) is formed in the bottom of the recess 23b in such a manner as to expose the bottom surface of the roller 9b. An opening 23b2 (refer to FIG. 4) is formed in the wall of the recess 23b in such a manner as to expose the side surface of the roller 9b.

As illustrated in FIG. 4, the first split body 11 is formed integrally with a retaining portion 24 extending in a longitudinal direction of the first split body 11. The retaining portion 24 engages with the edge of the roller 9a and the edge of the roller 9b to avoid the rollers 9a and 9b from coming out in the axial directions. The retaining portion 24 is placed between the guide rails 2 and 3.

The mating surface 14 of the rolling element holding portion 21 of the first split body 11 is formed integrally with many projections 26. The projections 26 are used for positioning to align the first split body 11 and the second split body 12. Holes into which the projections 26 are fitted are formed in the second split body 12 described below.

A gear holding surface 22a inclined relative to the mating surface 14 is formed on the gear holding portion 22. The gear holding surface 22a is substantially inclined at 45 degrees relative to the mating surface 14. The gear holding surface 22a faces a side surface 13b1 (refer to FIG. 2) of the gear 13. The gear holding surface 22a includes a first inclined surface 22a1 and a second inclined surface 22a2 (refer to FIG. 5). The first inclined surface 22a1 and the second inclined surface 22a2 are inclined relative to each other in such a manner as to permit slight runout of the gear 13.

A recess 25 in which a shaft 13c (refer to FIG. 2) of the gear 13 is housed is formed in the gear holding portion 22. The recess 25 has a groove shape and extends downward from the upper end of the gear holding portion 22 along the gear holding surface 22a.

Figure 6:
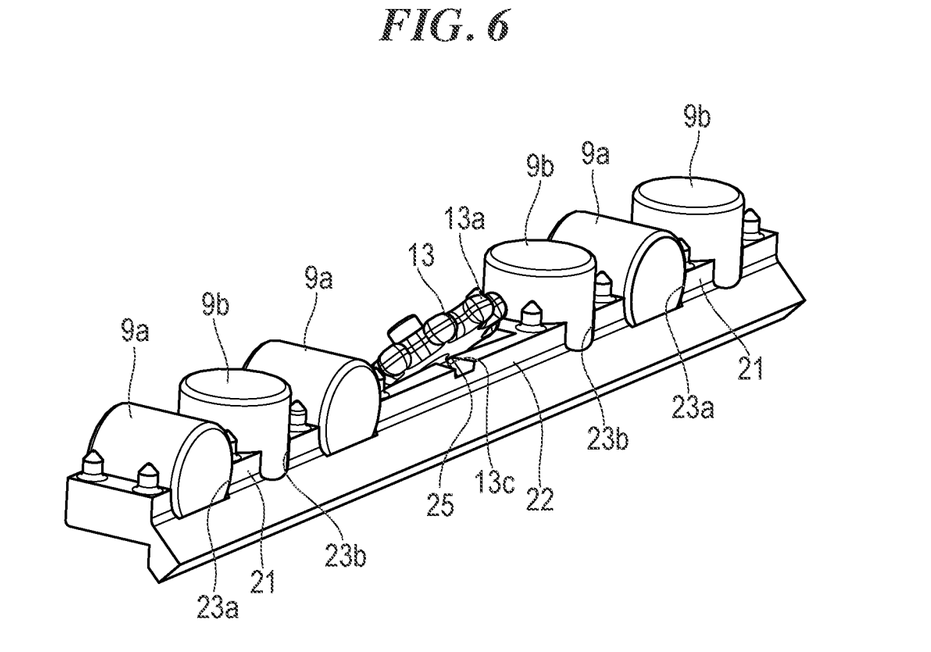
FIG. 6 is a perspective view illustrating a state where rolling elements and a gear have been assembled to the first split body.

FIG. 6 illustrates a state where the rollers 9a and 9b and the gear 13 have been assembled to the first split body 11. For example, the halves of the rollers 9a and 9b are inserted into the recesses 23a and 23b of the rolling element holding portion 21. The rollers 9a and 9b are supported by the rolling element holding portion 21. The shaft 13c of the gear 13 is inserted into the recess 25 of the gear holding portion 22. The gear 13 is supported by the gear holding portion 22.

Figure 7:
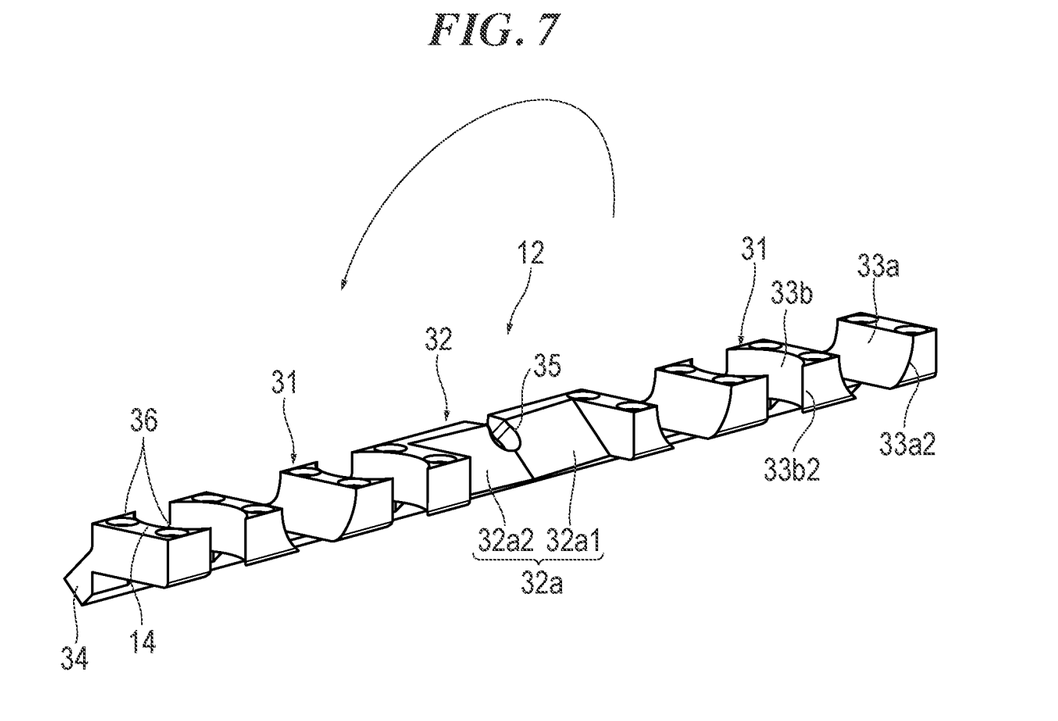
FIG. 7 is a perspective view of a second split body of the cage of the linear motion guide apparatus of the embodiment.

FIG. 7 illustrates a perspective view of the second split body 12. The second split body 12 illustrated in FIG. 7 is flipped 180 degrees and joined to the first split body 11, and then the cage illustrated in FIG. 2 is obtained.

As illustrated in FIG. 7, a rolling element holding portion 31 that holds the rollers 9a and 9b and a gear holding portion 32 that holds the gear 13 are integrally formed also in the second split body 12.

Recesses 33a and 33b in which the rollers 9a and 9b are partially housed are formed in the rolling element holding portion 31 of the second split body 12. For example, a half (upper half) of the roller 9a whose axis 9a1 points horizontally is housed in the recess 33a. The recess 33a is formed in a semi-cylindrical shape fitting the shape of the half of the roller 9a. The roller 9a is inserted into the recess 33a in the direction orthogonal to the axis 9a1. As illustrated in a plan view of FIG. 8, an opening 33a1 is formed in the bottom of the recess 33a in such a manner as to expose the side surface of the roller 9a. An opening 33a2 (refer to FIG. 7) is formed in the wall of the recess 33a in such a manner as to expose the bottom surface of the roller 9a.

Figure 8:
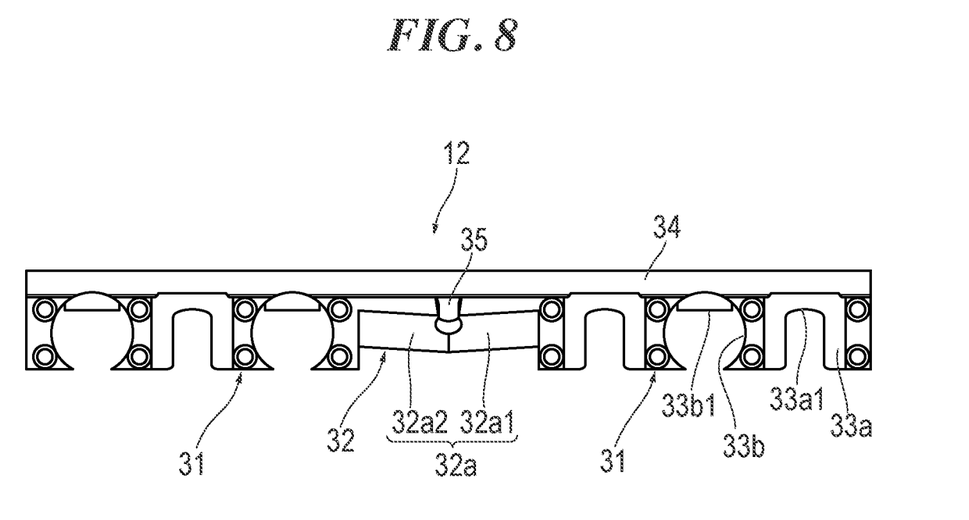
FIG. 8 is a plan view of the second split body.

As illustrated in FIG. 7, a half (upper half) of the roller 9b whose axis 9b1 points vertically is housed in the recess 33b. The recess 33b is formed in a short cylindrical shape fitting the shape of the half of the roller 9b. The roller 9b is inserted into the recess 33b in the axial direction. As illustrated in FIG. 8, an opening 33b1 is formed in the bottom of the recess 33b in such a manner as to expose the bottom surface of the roller 9b. An opening 33b2 (refer to FIG. 7) is formed in the wall of the recess 33b in such a manner as to expose the side surface of the roller 9b.

As illustrated in FIG. 7, the second split body 12 is formed integrally with a retaining portion 34 extending in a longitudinal direction of the second split body 12. The retaining portion 34 engages with the edge of the roller 9a and the edge of the roller 9b to avoid the rollers 9a and 9b from coming out in the axial directions. The retaining portion 34 is placed between the guide rails 2 and 3.

A gear holding surface 32a inclined relative to the mating surface 14 is formed on the gear holding portion 32 of the second split body 12. The gear holding surface 32a is substantially inclined at 45 degrees relative to the mating surface 14. The gear holding surface 32a faces a side surface 13b2 (refer to FIG. 2) of the gear 13. The gear 13 is placed between the gear holding surface 22a of the first split body 11 and the gear holding surface 32a of the second split body 12. The gear holding surface 32a includes a first inclined surface 32a1 and a second inclined surface 32a2. The first inclined surface 32a1 and the second inclined surface 32a2 are inclined relative to each other in such a manner as to permit slight runout of the gear 13.

A recess 35 in which the shaft 13c of the gear 13 is housed is formed in the gear holding portion 32. The recess 35 has a groove shape and extends from the upper end surface of the gear holding portion 32 along the gear holding surface 32a.

Holes 36 into which the many projections 26 of the first split body 11 fit are formed in the mating surface 14 of the second split body 12. The second split body 12 illustrated in FIG. 7 is flipped over to align with the first split body 11, and the first split body 11 and the second split body 12 are welded together, applying pressure between the first split body 11 and the second split body 12. The conical distal end portions of the many projections 26 of the first split body 11 are melted, and the first split body 11 and the second split body 12 are joined together. Note that the first split body 11 and the second split body 12 may be joined together by, for example, press-fit or snap-fit, instead of welding.

The configuration of the linear motion guide apparatus 1 of the embodiment is described above. The linear motion guide apparatus 1 of the embodiment has the following effects:

When the first split body 11 and the second split body 12 in which the rolling element holding portions 21 and 31 and the gear holding portions 22 and 32 are integrally formed are joined together, then it becomes possible to hold the rollers 9a and 9b and the gear 13 simultaneously. Hence, it is easy to assemble the linear motion guide apparatus 1.

Moreover, in the known linear motion guide apparatus, a roller is fitted into a hole in the cage having a plate shape, and a claw provided around the hole is deformed to hold the roller with the cage (refer to Patent Literature 1). Hence, there is a problem that the holding of the roller is weak. According to the linear motion guide apparatus 1 of the embodiment, the first split body 11 and the second split body 12 are joined together to hold the rollers 9a and 9b and the gear 13. Therefore, the rollers 9a and 9b and the gear 13 can be reliably held.

Furthermore, in the positional displacement control mechanism, when a force is transmitted from the gear 13 in the normal position to the rollers 9a and 9b that have been displaced from the normal position to return the rollers 9a and 9b to the normal position, the force can be reliably transmitted from the gear 13 to the rollers 9a and 9b because the rolling element holding portions 21 and 31 and the gear holding portions 22 and 32 are integrally formed.

The axis 9a1 of the roller 9a, which is one of the adjacent rollers 9a and 9b, and the center C of the other roller 9b are placed on substantially the same plane P as the mating surface 14. Therefore, simply by mounting the rollers 9a and 9b on the first split body 11, the rollers 9a and 9b can be assembled to the first split body 11, and the rollers 9a and 9b are hardly dropped from the first split body 11. Hence, it is easy to assemble the rollers 9a and 9b to the first split body 11.

In the rolling element holding portions 21 and 31 of the first split body 11 and the second split body 12, the recesses 23b and 33b into which one of the adjacent rollers 9a and 9b, the roller 9b, is inserted in the axial direction are formed. Also, the recesses 23a and 33a into which the other roller 9a is inserted in the direction orthogonal to the axis 9a1 are formed. Therefore, the rollers 9a and 9b can be easily assembled to the first split body 11 and the second split body 12.

Since the first split body 11 and the second split body 12 are welded together, the first split body 11 and the second split body 12 can be firmly joined together, and the rollers 9a and 9b and the gear 13 can be held more reliably.

Second Embodiment

Figure 9:
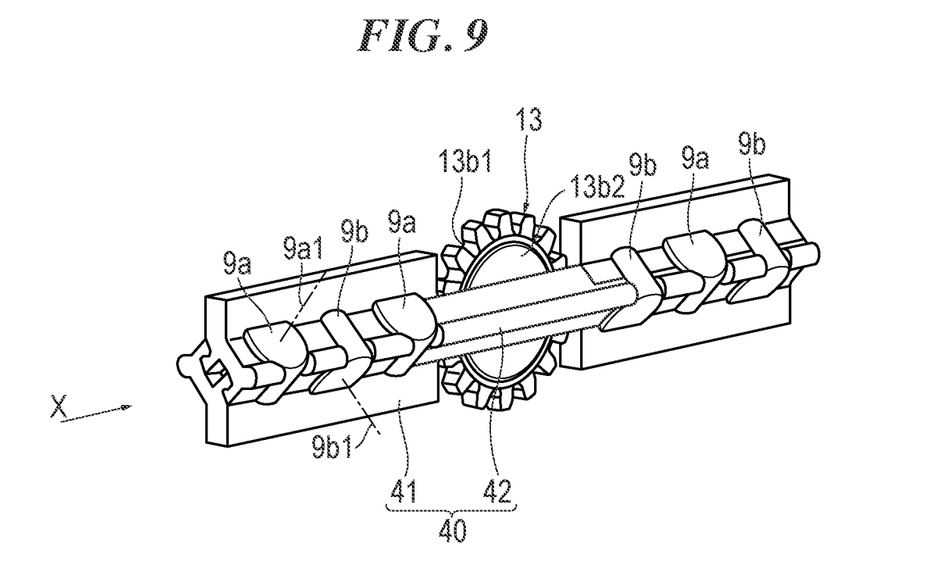
FIG. 9 is a perspective view of a cage incorporated in a linear motion guide apparatus of a second embodiment of the present invention.
Figure 10:
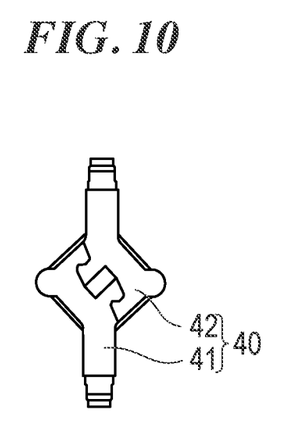
FIG. 10 is a view on arrow X of FIG. 9.

FIG. 9 illustrates a perspective view of a cage 40 incorporated in a linear motion guide apparatus of a second embodiment of the present invention. The configurations of guide rails 2 and 3, rollers 9a and 9b, and a gear 13 are the same as those of the linear motion guide apparatus 1 of the first embodiment.

As illustrated in FIG. 9, the rollers 9a and 9b and the gear 13 are held by the cage 40. The gear 13 is placed substantially in the middle of the cage 40 in a length direction thereof. The cage 40 includes a first split body 41 and a second split body 42 joined to each other by, for example, snap-fit. The first split body 41 and the second split body 42 have the same shape.

Figure 11:
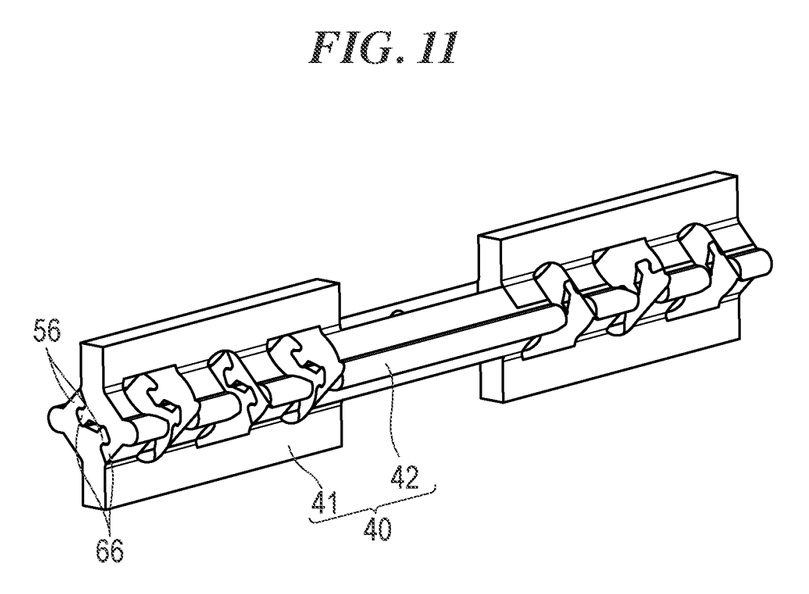
FIG. 11 is a perspective view of the cage (in a state where rollers and gear have been removed).
Figure 12:
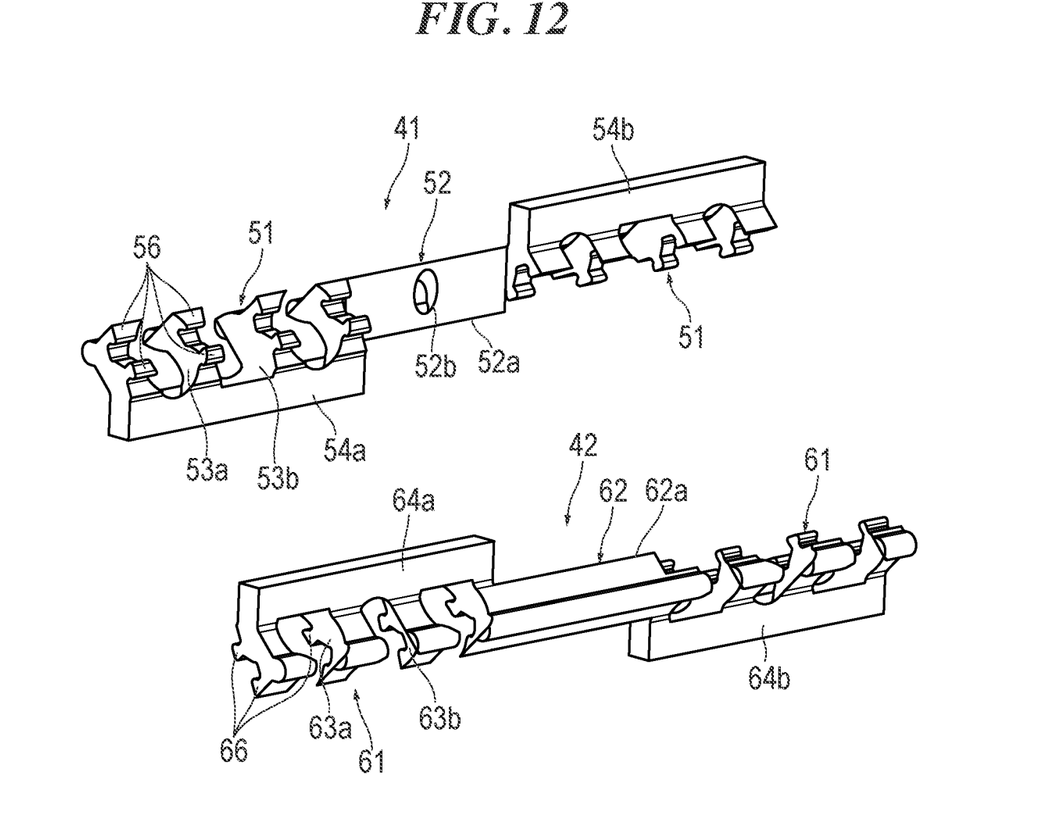
FIG. 12 is an exploded perspective view of the cage.

FIG. 11 illustrates a perspective view of the cage 40, and FIG. 12 illustrates an exploded perspective view of the cage 40. As illustrated in FIG. 12, a rolling element holding portion 51 that holds the rollers 9a and 9b and a gear holding portion 52 that holds the gear 13 are integrally formed in the first split body 41. The rolling element holding portion 51 and the gear holding portion 52 are integrally formed by, for example, resin molding, metal molding, laminate molding, or cutting.

Recesses 53a and 53b in which the rollers 9a and 9b are partially housed are formed in the rolling element holding portion 51 of the first split body 41. A half (lower half) of the roller 9a (refer to FIG. 9) whose axis 9a1 points obliquely upward is housed in the recess 53a. The recess 53a is formed in a short cylindrical shape fitting the shape of the half of the roller 9a. The roller 9a is inserted into the recess 53a in the axial direction.

A half (lower half) of the roller 9b (refer to FIG. 9) whose axis 9b1 points obliquely downward is housed in the recess 53b. The recess 23b is formed in a semi-cylindrical shape fitting the shape of the half of the roller 9b. The roller 9b is inserted into the recess 53b in a direction orthogonal to the axis 9b1.

The first split body 41 is formed integrally with retaining portions 54a and 54b extending in a longitudinal direction of the first split body 41. The retaining portions 54a and 54b engage with the edge of the roller 9a and the edge of the roller 9b to avoid the rollers 9a and 9b from coming out in the axial directions.

The rolling element holding portion 51 of the first split body 41 is formed integrally with many hooks 56. The hooks 56 of the first split body 41 engage with hooks 66 of the second split body 42. Therefore, the first split body 41 and the second split body 42 are joined together.

A gear holding surface 52a is formed on the gear holding portion 52. The gear holding surface 52a is substantially inclined at 45 degrees relative to the axis 9a1 of the roller 9a and the axis 9b1 of the roller 9b. The gear holding surface 52a faces the side surface 13b1 (refer to FIG. 9) of the gear 13. A recess 52b in which the shaft 13c of the gear 13 is housed is formed in the gear holding surface 52a. The recess 52b is in the form of a hole and is inclined relative to the gear holding surface 52a.

As illustrated in FIG. 12, a rolling element holding portion 61 that holds the rollers 9a and 9b and a gear holding portion 62 that holds the gear 13 are integrally formed also in the second split body 42.

Recesses 63a and 63b in which the rollers 9a and 9b are partially housed are formed in the rolling element holding portion 61 of the second split body 42. A half (upper half) of the roller 9a (refer to FIG. 9) whose axis 9a1 points obliquely upward is housed in the recess 63a. The recess 63a is formed in a short cylindrical shape fitting the shape of the half of the roller 9a. The roller 9a is inserted into the recess 63a in the axial direction.

A half (upper half) of the roller 9b whose axis 9b1 points obliquely downward is housed in the recess 63b. The recess 63b is formed in a semi-cylindrical shape fitting the shape of the half of the roller 9b. The roller 9b is inserted into the recess 63b in the direction orthogonal to the axis 9b1. The second split body 42 is formed integrally with retaining portions 64a and 64b.

A gear holding surface 62a facing the gear holding surface 52a of the first split body 41 is formed on the gear holding portion 62 of the second split body 42. The gear holding surface 62a is substantially inclined at 45 degrees relative to the axis 9a1 of the roller 9a and the axis 9b1 of the roller 9b. The gear holding surface 62a faces the side surface 13b2 (refer to FIG. 9) of the gear 13. The gear 13 is placed between the gear holding surface 52a and the gear holding surface 62a. A recess in which the shaft 13c of the gear 13 is housed is formed in the gear holding surface 62a.

The rolling element holding portion 61 of the second split body 42 is formed integrally with the many hooks 66. The hooks 66 engage with the hooks 56.

The linear motion guide apparatus of the second embodiment has the following effects:

When the first split body 41 and the second split body 42 in which the rolling element holding portions 51 and 61 and the gear holding portions 52 and 62 are integrally formed are joined together, then it becomes possible to hold the rollers 9a and 9b and the gear 13 simultaneously. Hence, it is easy to assemble the linear motion guide apparatus.

Moreover, the first split body 41 and the second split body 42 are joined together to hold the rollers 9a and 9b and the gear 13. Therefore, the rollers 9a and 9b and the gear 13 can be reliably held.

Furthermore, the rolling element holding portions 51 and 61 and the gear holding portions 52 and 62 are integrally formed. Therefore, a force can be reliably transmitted from the gear 13 to the rollers 9a and 9b.

In the rolling element holding portions 51 and 61 of the first split body 41 and the second split body 42, the recesses 53a and 63a into which one of the adjacent rollers 9a and 9b, the roller 9a, is inserted in the axial direction are formed. Also, the recesses 53b and 63b into which the other roller 9b is inserted in the direction orthogonal to the axis 9b1 are formed. Therefore, the rollers 9a and 9b can be easily assembled to the first split body 41 and the second split body 42.

Note that the present invention is not limited to concretization of the above embodiments, and can be concretized in other embodiments without changing the gist of the present invention.

In the above embodiments, a crossed roller is used as the rolling element. However, a ball may be used as the rolling element, or a parallel roller such as a needle roller may be used as the rolling element.

Note that the linear motion guide apparatus of the embodiments can be incorporated as an elementary component in a wide range of fields from industrial machine fields such as machine tools, semiconductor and liquid crystal manufacturing apparatuses (for example, mounters), and robots to consumer fields such as system kitchens, various game machines, medical machines, food machines, and conveyance apparatuses.

The present description is based on Japanese Patent Application No. 2021-012648 filed on Jan. 29, 2021. The entire contents thereof are included herein.

The invention claimed is:

1. A linear motion guide apparatus comprising:
   two guide rails that are movable relative to each other in a longitudinal direction thereof via a plurality of rolling elements; and
   a cage configured to hold the rolling elements and hold a gear engaging with a meshing portion provided on at least one of the two guide rails, wherein
   the cage includes: a first split body and a second split body, each of the first and second split bodies having a rolling element holding portion that holds the rolling element and a gear holding portion that holds the gear integrally formed therein,
   the first split body and the second split body are joined to each other,
   each of the rolling elements is a crossed roller in which axes of adjacent rollers are perpendicular to each other, and
   the axis of one of the adjacent rollers and a center of another roller are placed on substantially a same plane as a mating surface between the first split body and the second split body.

2. The linear motion guide apparatus according to claim 1, wherein the first split body and the second split body are welded together.

3. The linear motion guide apparatus according to claim 1, wherein a gear holding surface inclined relative to the mating surface is formed on the gear holding portion of each of the first split body and the second split body.

4. The linear motion guide apparatus according to claim 3, wherein the first split body and the second split body are welded together.

\* \* \* \* \*